(12) United States Patent
Yoon et al.

(10) Patent No.: US 9,952,462 B2
(45) Date of Patent: Apr. 24, 2018

(54) DISPLAY DEVICE

(71) Applicant: SAMSUNG DISPLAY CO., LTD., Yongin-si, Gyeonggi-do (KR)

(72) Inventors: Seontae Yoon, Seoul (KR); Junghyun Kwon, Seoul (KR); Minki Nam, Anseong-si (KR); Haeil Park, Seoul (KR); Kwangkeun Lee, Osan-si (KR); Junhan Lee, Incheon (KR)

(73) Assignee: SAMSUNG DISPLAY CO., LTD. (KR)

( * ) Notice: Subject to any disclaimer, the term of this patent is extended or adjusted under 35 U.S.C. 154(b) by 103 days.

(21) Appl. No.: 15/069,835

(22) Filed: Mar. 14, 2016

(65) Prior Publication Data

US 2016/0306226 A1 Oct. 20, 2016

(30) Foreign Application Priority Data

Apr. 20, 2015 (KR) .......................... 10-2015-0055336

(51) Int. Cl.
*G02F 1/1339* (2006.01)
*G02F 1/1333* (2006.01)
*G02F 1/1335* (2006.01)

(52) U.S. Cl.
CPC .. *G02F 1/133377* (2013.01); *G02F 1/133617* (2013.01); *G02F 2001/133521* (2013.01)

(58) Field of Classification Search
CPC ......... G02F 1/133377; G02F 1/133617; G02F 2001/133521
USPC ........................................................ 349/156
See application file for complete search history.

(56) References Cited

U.S. PATENT DOCUMENTS

| | | |
|---|---|---|
| 2006/0244367 A1 | 11/2006 | Im et al. |
| 2007/0058107 A1 | 3/2007 | Im et al. |
| 2012/0074833 A1 | 3/2012 | Yuan et al. |
| 2012/0287381 A1 | 11/2012 | Li et al. |
| 2013/0242228 A1* | 9/2013 | Park ................. G02F 1/133617 349/61 |
| 2014/0055721 A1 | 2/2014 | Choi et al. |
| 2014/0160408 A1 | 6/2014 | Cho et al. |

FOREIGN PATENT DOCUMENTS

| | | |
|---|---|---|
| KR | 10-2009-0033891 A | 4/2009 |
| KR | 10-2011-0109289 A | 10/2011 |
| KR | 10-2014-0027794 A | 3/2014 |
| KR | 10-2014-0074495 A | 6/2014 |

\* cited by examiner

*Primary Examiner* — Lucy Chien
(74) *Attorney, Agent, or Firm* — Innovation Counsel LLP

(57) ABSTRACT

A display device includes: a first substrate; a support layer defining a microcavity above the first substrate; a liquid crystal layer disposed in the microcavity; a planarization layer disposed on the support layer; and a blue-light transmission layer disposed between the support layer and the planarization layer. The display device has improved light extraction efficiency and process efficiency.

20 Claims, 12 Drawing Sheets

DISPLAY DEVICE

CROSS-REFERENCE TO RELATED APPLICATION

This application claims the priority to and the benefits under 35 U.S.C. § 119 of Korean Patent Application No. 10-2015-0055336, filed on Apr. 20, 2015, with the Korean Intellectual Property Office (KIPO), the disclosure of which is incorporated herein by reference in its entirety.

BACKGROUND

1. Field

The present disclosure relates to a display device with improved light extraction efficiency and a process of forming a blue-light transmission layer.

2. Description of the Related Art

A liquid crystal display (LCD) device is a type of flat panel displays (FPDs) that have recently found wide applications. An LCD device includes two substrates including electrodes formed thereon and a liquid crystal layer interposed between the two substrates. When a voltage is applied to two electrodes, liquid crystal molecules of the liquid crystal layer are rearranged to adjust an amount of transmitted light.

The LCD device may use a color filter including a fluorescent substance, for example, a phosphor, in lieu of a conventional color filter, to represent a color. The LCD device using a color filter including a fluorescent substance may provide an improved viewing angle and color reproduction.

Quantum dots may be utilized as the fluorescent substance included in a color filter. For example, a quantum dot absorbs blue light, converts a blue color of the blue light to a red or green color, and emits the converted light in all directions. Thus, among the light emitted from the quantum dot, the light emitted toward an opposite direction from a direction of a display surface may be dissipated. Accordingly, a blue-light transmission layer, which is a kind of band pass filters, is disposed below the color filter to reflect light upwards and convert the blue color to a red or green color. Thus, the blue-light transmission layer enhances light extraction efficiency. However, when the blue-light transmission layer is disposed on the color filter, the color filter may deteriorate and light conversion efficiency of the quantum dot may be diminished because the blue-light transmission layer is deposited at a high temperature of 200 degrees or higher.

It is to be understood that this background of the present disclosure is intended to provide useful information for understanding the relevant art and as such disclosed herein, the background section may include ideas, concepts or recognitions that were not a part of information that was known or appreciated by those skilled in the pertinent art prior to a corresponding effective filing date of the present disclosure.

SUMMARY

The present disclosure is directed to a display device that provides enhanced light extraction efficiency while preventing degradation of a color filter.

According to an exemplary embodiment of the present disclosure, a display device includes: a first substrate; a support layer defining a microcavity above the first substrate; a liquid crystal layer disposed in the microcavity; a planarization layer disposed on the support layer; and a blue-light transmission layer disposed between the support layer and the planarization layer.

The display device may further include: a pixel electrode disposed below the support layer; and a common electrode disposed between the support layer and the planarization layer.

The blue-light transmission layer may be disposed between the support layer and the common electrode.

The blue-light transmission layer may be disposed between the common electrode and the planarization layer.

The display device may further include a light blocking member disposed between the support layer and an adjacent support layer.

The blue-light transmission layer may be disposed between the support layer and the light blocking member.

The blue-light transmission layer may be disposed between the light blocking member and the planarization layer.

The display device may further include: a backlight unit disposed below the first substrate, the backlight unit including a light source; a second substrate disposed opposite to the first substrate; a color filter disposed on the second substrate; a first polarizing plate disposed below the liquid crystal layer; and a second polarizing plate between the liquid crystal layer and the color filter.

The light source may be a blue light source.

The color filter may include a red color filter, a green color filter, and a transparent color filter, and the transparent color filter may include light scattering particles.

The display device may further include a blue-light blocking layer disposed on the red color filter and the green color filter.

The display device may further include an alignment layer disposed on an inner surface of the support layer.

According to another exemplary embodiment of the present disclosure, a display device includes: a first substrate; a support layer defining a microcavity above the first substrate; a liquid crystal layer formed in the microcavity; a planarization layer disposed on the support layer; a second substrate disposed opposite to the first substrate; a color filter disposed on the second substrate; a first polarizing plate disposed below the liquid crystal layer; a second polarizing plate disposed between the liquid crystal layer and the color filter; and a blue-light blocking layer disposed between the planarization layer and the second polarizing plate.

The display device may further include a patterned insulating layer disposed between the planarization layer and the second polarizing plate.

The blue-light blocking layer may be disposed between the planarization layer and the patterned insulating layer.

The blue-light blocking layer may be disposed between the patterned insulating layer and the second polarizing plate.

The display device may further include: a backlight unit, the backlight unit being disposed below the first substrate and including a light source.

The light source may be a blue light source.

The color filter may include a red color filter, a green color filter, and a transparent color filter, and the transparent color filter may include light scattering particles.

The display device may further include a blue-light blocking layer disposed on the red color filter and the green color filter.

According to some embodiments of the present disclosure, a display device may have improved light extraction efficiency. Even when disposing a blue-light transmission layer in the display device, degradation of a color filter may be prevented and process efficiency may be enhanced.

The foregoing is illustrative only and is not intended to be in any way limiting. In addition to the illustrative aspects, embodiments, and features described herein, further aspects, embodiments, and features will become apparent by reference to the drawings and the following detailed description.

BRIEF DESCRIPTION OF THE DRAWINGS

The above and other features and aspects of the present disclosure will be more clearly understood from the following detailed description in conjunction with the accompanying drawings, in which.

DETAILED DESCRIPTION

Figure 1:
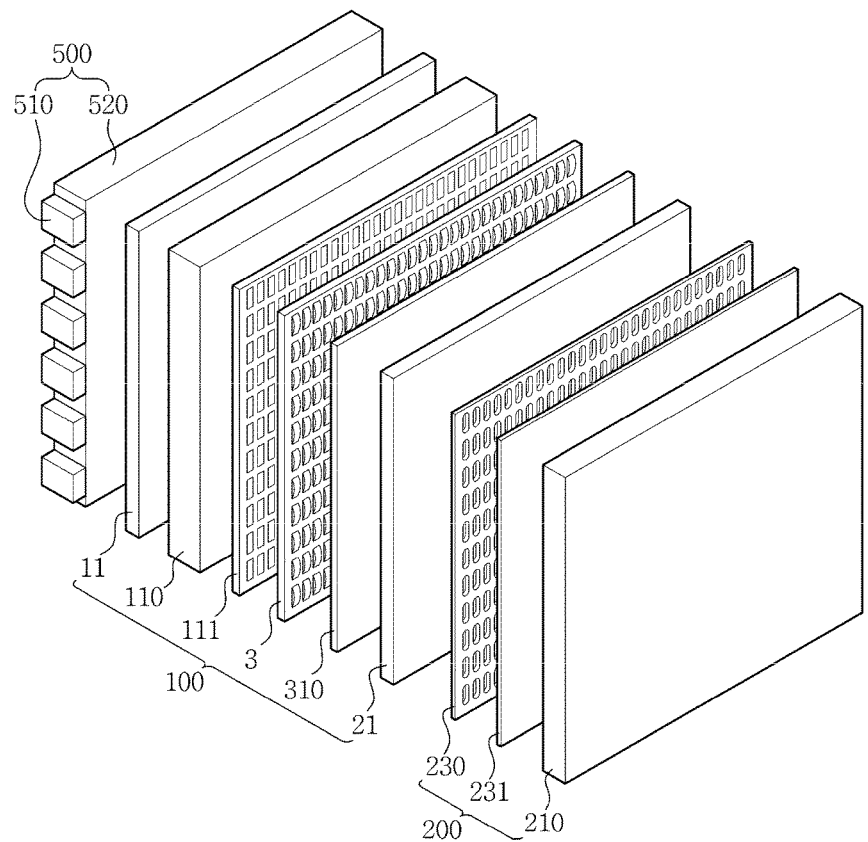
FIG. 1 is an exploded perspective view illustrating a liquid crystal display ("LCD") device, according to a first exemplary embodiment.

Advantages and features of the present disclosure will be made clear from embodiments described below in detail with reference to the accompanying drawings. The present disclosure may, however, be embodied in many different forms and should not be construed as being limited to the embodiments set forth herein. Rather, these embodiments are provided so that the present disclosure will be thorough and complete, and will fully convey the scope of the present disclosure to those skilled in the art. The present disclosure may be defined by the scope of the claims. Therefore, well-known constituent elements, operations and techniques may not be described in detail in the embodiments in order to prevent the present disclosure from being obscurely interpreted. Like reference numerals refer to like elements throughout the specification.

The spatially relative terms "below," "beneath," "lower," "above," "upper," and the like, may be used herein for ease of description to describe the relations between one element or component and another element or component. It will be understood that the spatially relative terms are intended to encompass different orientations of a device in use or operation, in addition to the orientation depicted in the drawings. For example, in the case where a device shown in the drawing is turned over, the device positioned "below" or "beneath" another device may be placed "above" another device. Accordingly, the illustrative term "below" may include both the lower and upper positions. The device may also be oriented in another direction, and thus the spatially relative terms may be interpreted differently depending on the orientation.

Throughout the specification, when an element is referred to as being "connected" to another element, the element is "directly connected" to the other element, or "electrically connected" to the other element with one or more intervening elements interposed therebetween. It will be further understood that the terms "comprises," "comprising," "includes," and/or "including," when used in this specification, specify the presence of stated features, integers, steps, operations, elements, and/or components, but do not preclude a presence or an addition of one or more other features, integers, steps, operations, elements, components, and/or groups thereof.

Unless otherwise defined, terms used herein (including technical and scientific terms) have the same meaning as commonly understood by those skilled in the art to which the present disclosure pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the present disclosure.

Figure 2:
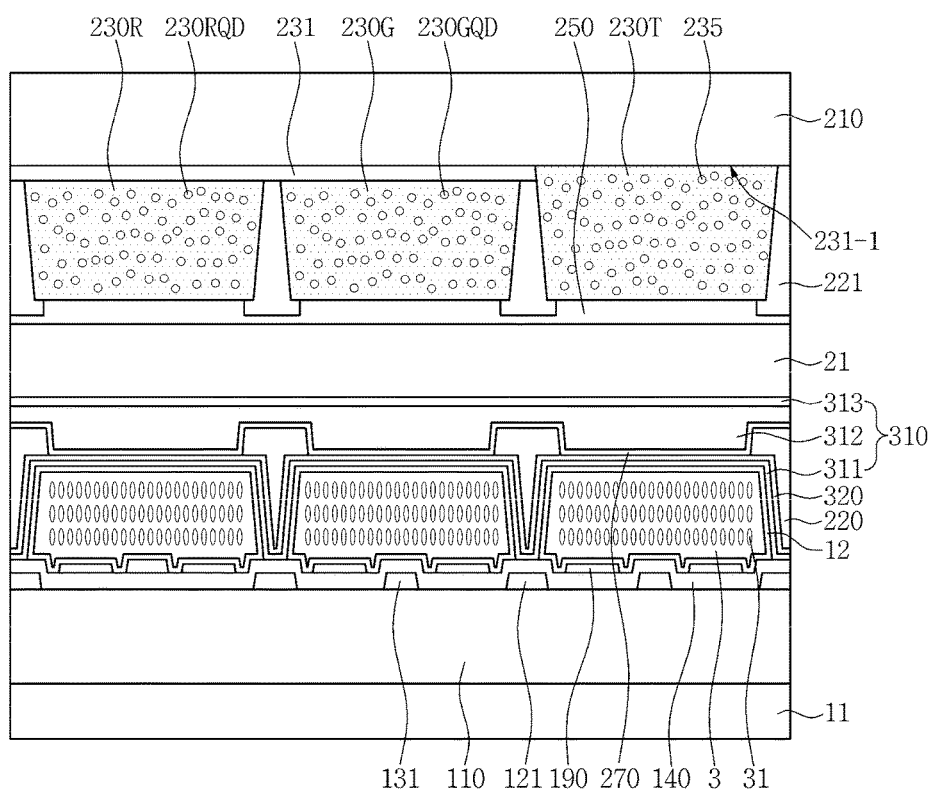
FIG. 2 is a cross-sectional view illustrating the LCD device of FIG. 1.

Hereinafter, a display device according to a first embodiment of the present disclosure will be described with reference to FIGS. 1 and 2. FIG. 1 is an exploded perspective view illustrating a liquid crystal display ("LCD") device, according to the first exemplary embodiment. FIG. 2 is a cross-sectional view illustrating the LCD device of FIG. 1.

As illustrated in FIG. 1, the LCD device includes a lower display panel 100, an upper display panel 200, and a backlight unit 500. The backlight unit 500 includes a blue light source 510 and a light guide plate 520. The lower display panel 100 disposed above the backlight unit 500 includes a first polarizing plate 11, a first substrate 110, a wiring layer 111, a liquid crystal layer 3 formed in a microcavity 305 (referring to FIG. 12), an insulating layer 310, a blue-light transmission layer 320, and a second polarizing plate 21. An upper display panel 200 disposed above the lower display panel 100 includes a second substrate 210, a blue-light blocking layer 231, and a color filter 230.

Figure 3:
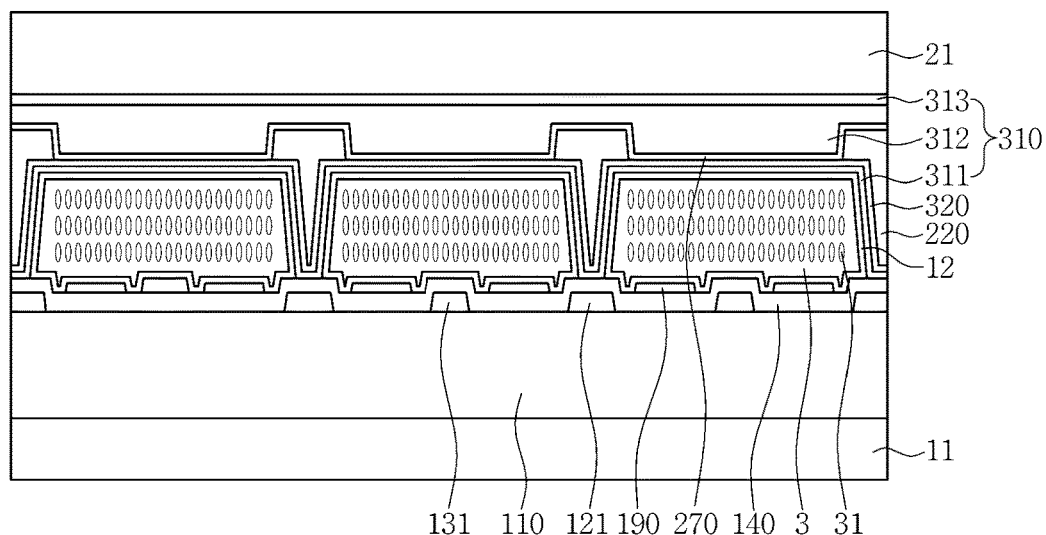
FIG. 3 is a cross-sectional view illustrating a lower display panel provided in the LCD device of FIG. 1.

First, the lower display panel 100 will be described with reference to FIGS. 1, 2, and 3. FIG. 3 is a cross-sectional view illustrating the lower display panel 100 provided in the LCD device of FIG. 1.

In reference to FIGS. 1, 2, and 3, the wiring layer 111 including a thin film transistor (not illustrated) and the like may be disposed on the first substrate 110 that is formed of a transparent material, such as glass or plastic. The wiring layer 111 includes a gate line 121, a storage voltage line 131, a gate insulating layer 140, a data line (not illustrated), a protection layer (not illustrated), and a pixel electrode 190, and the thin film transistor may be connected to the gate line 121 and the data line. Configurations of the pixel electrode 190, the gate line 121, and the data line formed on the wiring layer 111 may vary in accordance with different exemplary embodiments.

The gate line 121 and the storage voltage line 131 may be disposed below the gate insulating layer 140 and may be electrically separated from each other. The data line may be insulated from the gate line 121 and the storage voltage line 131 and disposed to intersect the gate line 121 and the storage voltage line 131. A gate electrode on the gate line 121 and a source electrode on the data line may form a control terminal and an input terminal of the thin film transistor, respectively. Further, an output terminal of the thin film transistor, i.e., a drain electrode, may be connected to the pixel electrode 190, and the pixel electrode 190 may be insulated from the gate line 121, the storage voltage line 131, and the data line.

A support layer 311 may be disposed above the pixel electrode 190 and the protection layer. The support layer 311 may serve to support elements such as a common electrode 270, as will be described further below, and secure a space hereinafter referred to as microcavity 305 (referring to FIG. 12)) that is an inside space of the support layer 311 and a space above the pixel electrode 190 and the protection layer. The support layer 311, according to the first exemplary embodiment, may have a trapezoidal cross-section and a liquid crystal inlet 335 (referring to FIG. 15) on a side surface of the trapezoidal cross-section to inject liquid crystals into the microcavity 305. The support layer 311 may include an inorganic insulating material such as silicon nitride ($SiN_x$).

Further, an alignment layer 12 may be formed inside the support layer 311, and above the pixel electrode 190 and the protection layer to align liquid crystal molecules injected into the microcavity 305. The alignment layer 12 may include at least one of substances commonly used to form a liquid crystal alignment layer, for example, polyamic acid, polysiloxane, polyimide, or the like.

The liquid crystal layer 3 may be formed inside the alignment layer 12 of the microcavity 305, and by the alignment layer 12, liquid crystal molecules 31 may be aligned in an initial alignment. The liquid crystal layer 3 may have a thickness in a range of about 5 to 6 μm.

The blue-light transmission layer 320 may be disposed between the support layer 311 and a first light blocking member 220 and between the support layer 311 and the common electrode 270. The blue-light transmission layer 320 may be formed over an entire area of the lower display panel 100. The blue-light transmission layer 320 may have a structure in which at least two layers having different refractive indices are alternately stacked, and may serve to transmit a component of light in a blue wavelength range and block the remainder of the light in a wavelength range aside from the blue wavelength range. The light in the blocked wavelength range may be reflected off and recycled. The blue-light transmission layer 320 is configured to transmit blue light incident from a blue light source 510 and block light in other wavelength ranges.

According to one embodiment, the blue-light transmission layer 320 includes a dichroic filter. The dichroic filter may reflect a second light that has a wavelength different from that of a first light that is incident onto the dichroic filter, and selectively transmit a component of light having a wavelength that is the same as that of the first light. The first light corresponds to blue light emitted from the blue light source 510, and the second light having a wavelength different from that of the first light corresponds to red or green light. The second light is converted to the first light by the color filter 230. Accordingly, among the second light emitted from the color filter 230, the light emitted backwardly from the lower display panel 100 may be reflected off the blue-light transmission layer 320 to be emitted toward the lower display panel 100.

According to one embodiment, the blue-light transmission layer 320 has a multi-layer structure including at least a first thin film formed of a high refractive-index substance and at least a second thin film formed of a low refractive-index substance that are alternately stacked. By virtue of high reflectivity attributed to thin film interference over the multi-layer, the blue-light transmission layer 320 may achieve a selective light transmission property. A substance having a low refractive index may include metal or metal oxide such as magnesium fluoride ($MgF_2$) or silicon dioxide ($SiO_2$), and a substance having a high refractive index may include metal or metal oxide such as silver (Ag), $TiO_2$, $Ti_2O_3$, $Ta_2O_3$, and the like, but the present disclosure is not limited thereto. A thickness of each thin film may be determined based on a design, a manufacturing process, and/or a desired light transmission property, for example, in a range of about an eighth to half of a wavelength of transmitted light.

When the blue-light transmission layer 320 has a structure in which a plurality of dielectric thin films, each having different refractive indices, are stacked, thin film interference over the multi-layer may be caused due to a mirror surface of the multi-layer that has a reflectivity much higher than that of metal. Thus, the blue-light transmission layer 320 having a multi-layer of dielectric thin films may be used as an edge filter that has an abrupt transition of reflectivity with respect to a specific wavelength.

The blue-light transmission layer 320 may selectively transmit/reflect light in a specific wavelength range based on a configuration of the dielectric thin film, and thereby the efficiency of light utilization can be improved. For example, in a case where the first light incident onto the color filter 230 is blue light, the blue-light transmission layer 320 may be designed to transmit the blue light and reflect green light and red light. Accordingly, among green light and red light emitted from the color filter 230, the second light that is emitted backwardly of the lower display panel 100 may be reflected off the blue-light transmission layer 320 and emitted toward the lower display panel 100. In this manner, the blue-light transmission layer 320 may enhance light efficiency of the LCD device.

According to one embodiment, the first light blocking member (BM) 220 is formed between the adjacent support layers 311. The first light blocking member 220 may include a material that prevents transmission of light and may have an aperture that corresponds to the microcavity 305.

The common electrode 270 may be formed above the blue-light transmission layer 320 and the first light blocking member 220. The common electrode 270 and the pixel electrode 190 may be formed of a transparent conductive material such as indium tin oxide (ITO) or indium zinc oxide (IZO). An electric field applied between the common electrode 270 and the pixel electrode 190 controls an alignment direction of the liquid crystal molecules 31.

In one embodiment, a planarization layer 312 is formed on the common electrode 270. The planarization layer 312 may serve to eliminate a step difference formed on the common electrode 270 due to the first light blocking member 220. The planarization layer 312 may include an organic material. In another embodiment, the planarization layer 312 may be disposed below the common electrode 270 that is made of a dissimilar material. In some embodiments, the planarization layer 312 may be omitted.

A patterned insulating layer 313 may be formed above the planarization layer 312. The patterned insulating layer 313 may include an inorganic insulating material such as silicon nitride ($SiN_x$). The planarization layer 312, the blue-light transmission layer 320, and the patterned insulating layer 313, along with the support layer 311, may be patterned together to form the liquid crystal inlet 335. In some embodiments, the patterned insulating layer 313 may be omitted.

Referring to FIG. 1, the insulating layer 310 may collectively include the support layer 311, the planarization layer 312, and the patterned insulating layer 313. As illustrated in FIG. 2, the common electrode 270 may be disposed between the blue-light transmission layer 320 and the planarization layer 312. However, in some embodiments, the common electrode 270 may be disposed above the planarization layer 312 or the patterned insulating layer 313.

The second polarizing plate 21 may be disposed above the patterned insulating layer 313. The second polarizing plate 21, in particular, may be formed to have a thickness in a range of about 150 to 200 μm. The second polarizing plate 21 may include a polarizing element that generates a polarized light and a tri-acetyl-cellulose (TAC) layer that may secure device durability.

Meanwhile, the first polarizing plate 11 may be attached onto a rear surface of the first substrate 110. The first polarizing plate 11 may include a polarizing element that generates a polarized light and a tri-acetyl-cellulose (TAC) layer that may secure device durability. Further, the first polarizing plate 11 may be formed between the first substrate 110 and the wiring layer 111, but alternatively, may be disposed in another position.

Hereinafter, descriptions pertaining to the upper display panel 200 will be provided. The upper display panel 200 may be disposed on the second polarizing plate 21.

In reference to FIGS. 1 and 2, the upper display panel 200 may have a structure in which the blue-light blocking layer 231 is formed below the second substrate 210 that includes a transparent material such as glass or plastic. The blue-light blocking layer 231 may have an aperture 231-1 in a pixel region for displaying a blue color and pixel regions for displaying red and green colors. The blue-light blocking layer 231 may have a structure in which at least two layers having different refractive indices are alternately stacked. The blue-light blocking layer 231 may serve to transmit a component of light having a wavelength aside from a blue wavelength range and to block another component of light in the blue wavelength range. The blocked light having the blue wavelength may be reflected off the blue-light blocking layer 231 and recycled. Since the blue-light blocking layer 231 is configured to prevent light emitted from the blue light source 510 from being directly emitted outwards, the blue-light blocking layer 231 may not be formed in a pixel region for displaying a blue color, but may be formed in pixel regions for displaying red and green colors.

According to the first exemplary embodiment, a blue light source is used, and the aperture 231-1 is formed in a pixel region for displaying a blue color. However, in other embodiments, a red or green light source may be utilized, and an aperture may be formed in a pixel region that displays the corresponding color.

A second light blocking member 221 may be formed below the second substrate 210 and the blue-light blocking layer 231. The second light blocking member 221 may have an aperture, and within each aperture, the color filter 230 corresponding to a color displayed by the corresponding pixel may be formed.

First, a red color filter 230R may be formed in the red pixel, a green color filter 230G may be formed in the green pixel, and a transparent color filter 230T may be formed in the blue pixel. The transparent color filter 230T is used in the blue pixel because a blue light source is used as the light source 510 of the backlight unit 500 as illustrated in the exemplary embodiment of FIGS. 1 and 2.

The red color filter 230R may include red quantum dot particles 230RQD, and may convert the color of light emitted from the blue light source 510 into a red color. Further, the green color filter 230G may include green quantum dot particles 230GQD, and may convert the color of light emitted from the blue light source 510 into a green color. In addition, the transparent color filter 230T may include scattering particles 235 that may not convert a wavelength of light emitted from the blue light source 510 but may vary a propagation direction of the light. The scattering particles 235 may be, for example, a $TiO_2$ particle and the like, and may have a size substantially corresponding to a size of the red quantum dot particle 230RQD or the green quantum dot particle 230GQD.

According to the first exemplary embodiment, light emitted from the light source 510 of the backlight unit 500 may be scattered at the red quantum dot particle 230RQD, the green quantum dot particle 230GQD, and the scattering particle 235, and then emitted outwards to display an image. Thus, the light emitted outwards may propagate over a relatively large area, and a gray scale of the light may not vary over the display area, and thereby a wide viewing angle can be realized.

The color filter 230 may be elongated along a column of the pixel electrode 190, and pixels of the same color may be arranged along its column direction. In some embodiments, the color filter 230 may not represent three primary colors of red, green, and blue, and may represent one of cyan, magenta, yellow, and white colors.

A cover layer 250 may be formed below the second light blocking member 221, the red color filter 230R, the green color filter 230G, and the transparent color filter 230T. The cover layer 250 may be formed of an organic material. In some embodiment, the cover layer 250 may be omitted.

The lower display panel 100 may be disposed below the cover layer 250. The second polarizing plate 21 of the lower display panel 100 and the cover layer 250 may be attached to each other directly or using an additional adhesive.

As such, as the blue-light transmission layer 320 is disposed between the support layer 311 and the planarization layer 312, rather than being disposed on the upper display panel 200, light extraction efficiency may be improved, degradation of the color filter 230 may be prevented, and process efficiency may be enhanced. Since the blue-light transmission layer 320 is not deposited on the color filter 230 at a high temperature, degradation of the color filter 230 may be prevented and the process may be simplified.

Hereinafter, a method of manufacturing the lower display panel 100 will be described in detail with reference to FIGS. 4-15. FIGS. 4-15 are views sequentially illustrating an exemplary method of manufacturing the lower display panel 100 of FIG. 1.

Figure 4:
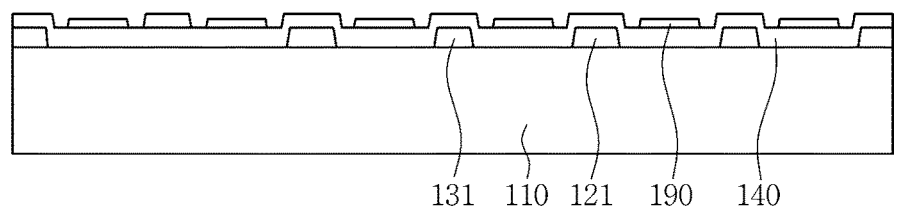
FIGS. 4-15 are views sequentially illustrating a method of manufacturing the lower display panel of FIG. 1.

First, as illustrated in FIG. 4, a wiring layer 111 including a thin film transistor and the like is formed on a first substrate 110. The first substrate 110 may be formed of a transparent material such as glass or plastic. The wiring layer 111 may include a gate line 121, a storage voltage line 131, a gate insulating layer 140, a data line (not illustrated), a protection layer (not illustrated), and a pixel electrode 190. The thin film transistor may be connected to the gate line 121 and the data line. Although the wiring layer 111 is described as simply being formed on the first substrate 110 in FIG. 4, a plurality of processes may be performed to form the wiring layer 111.

The method of forming the wiring layer 111 will be described below by way of examples. The gate line 121 and the storage voltage line 131 may be formed on the first substrate 110, and the gate insulating layer 140 may be then formed to cover the first substrate 110, the gate line 121, and the storage voltage line 131. The data line may be formed on the gate insulating layer 140 in a direction to intersect the gate line 121 and the storage voltage line 131. A drain electrode that is an output terminal of the thin film transistor may also be formed. Subsequently, a protection layer for covering the data line and the drain electrode may be formed, and a contact hole for exposing a portion of the drain electrode may be formed in the protection layer. The pixel electrode 190 may be formed on the protection layer, and may be electrically connected to the drain electrode through the contact hole of the protection layer. FIG. 4 comprehensively illustrates the plurality of processes described hereinabove. Configurations of the pixel electrode 190, the gate line 121, and the data line formed on the wiring layer 111 may vary based on each exemplary embodiment.

Figure 5:
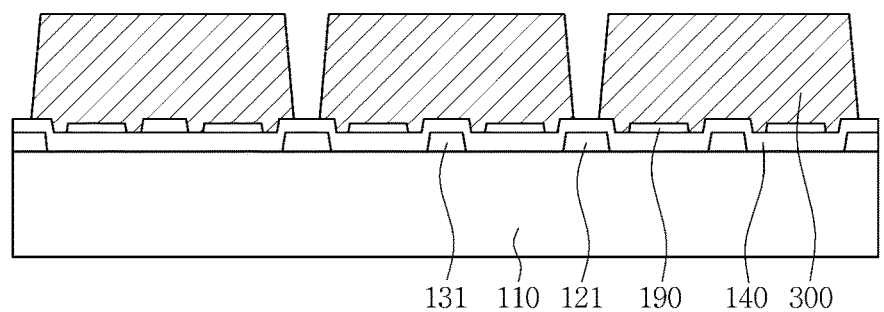

Subsequently, in reference to FIG. 5, a sacrificial layer 300 is formed in an area where a microcavity 305 is to be formed. The sacrificial layer 300 may include a photoresist material, and may be etched based on a position, a size, and a shape of the microcavity 305 to be formed. The microcavity 305 is a space in which the liquid crystal layer 3 is to be formed, and thus corresponds to the pixel region.

Figure 6:
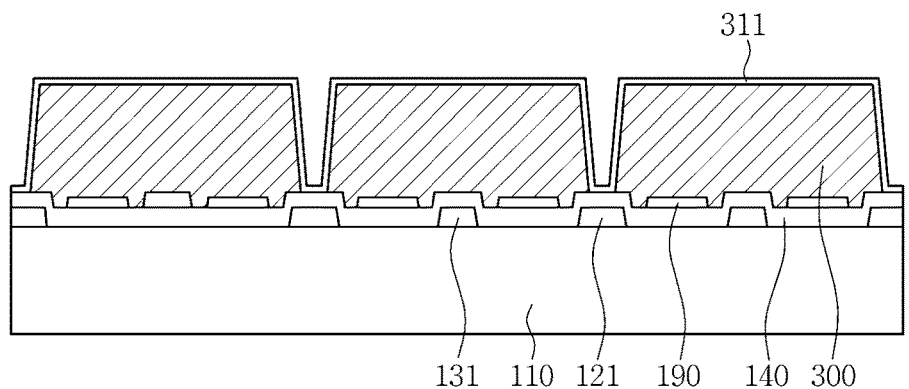

Subsequently, in reference to FIG. 6, a support layer 311 is formed to cover the sacrificial layer 300 and the exposed wiring layer 111. The support layer 311 may include an inorganic insulating material, such as silicon nitride ($SiN_x$), and may have a thickness of about 2000 Å. Further, the support layer 311 may be formed to entirely cover the sacrificial layer 300 along a surface of the sacrificial layer 300, as illustrated in FIG. 6. As illustrated in FIG. 6, the sacrificial layer 300 and the support layer 311 may have a trapezoidal cross-section.

Figure 7:
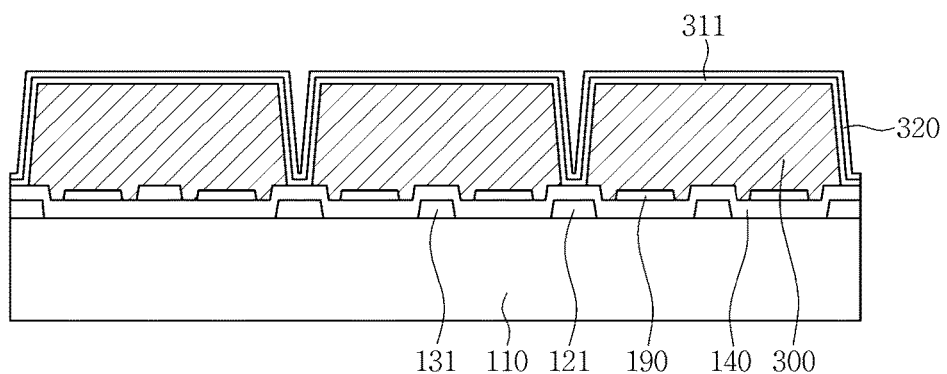

Subsequently, in reference to FIG. 7, a blue-light transmission layer 320 is formed on the support layer 311. The blue-light transmission layer 320 may be formed by stacking at least a thin film formed of a high refractive-index substance and at least a thin film formed of a low refractive-index substance into a multi-layer structure.

Figure 8:
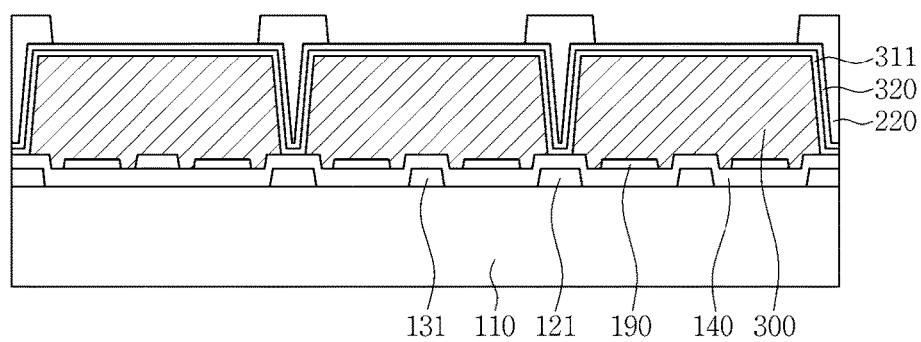

Next, as illustrated in FIG. 8, a first light blocking member (BM) 220 is formed between the adjacent support layers 311. The first light blocking member 220 may include a material that may block light, and may have an aperture. The aperture of the first light blocking member 220 may correspond to the sacrificial layer 300 or the microcavity 305.

Figure 9:
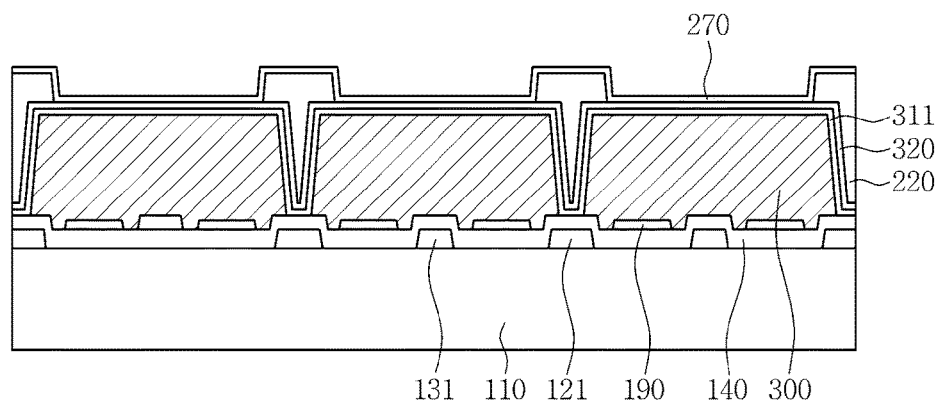

Subsequently, as illustrated in FIG. 9, a common electrode 270 is formed to cover the blue-light transmission layer 320 and the first light blocking member 220. The common electrode 270 may include a transparent conductive material such as indium tin oxide (ITO) or indium zinc oxide (IZO). An electric field applied between the common electrode 270 and the pixel electrode 190 controls an alignment direction of the liquid crystal molecules 31.

Figure 10:
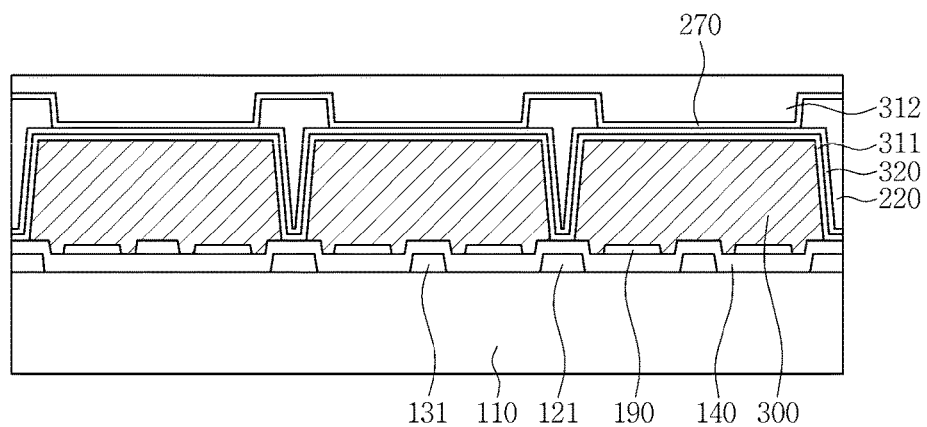

Subsequently, as illustrated in FIG. 10, a planarization layer 312 is formed. The planarization layer 312 may serve to eliminate a step difference formed on the common electrode 270 due to the first light blocking member 220. The planarization layer 312 may include an organic material.

Figure 11:
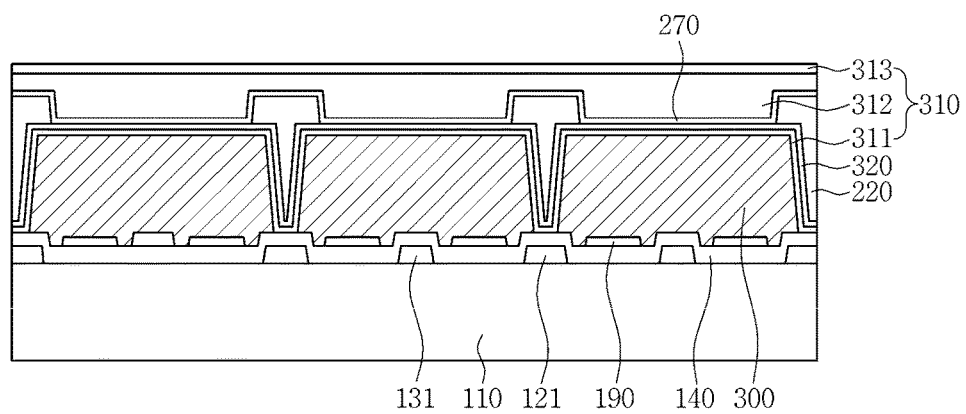

Subsequently, as illustrated in FIG. 11, a patterned insulating layer 313 is formed above the planarization layer 312. In the patterned insulating layer 313, an inorganic insulating material, such as silicon nitride ($SiN_x$), may be laminated to have a thickness of about 2000 Å. Subsequently, the laminated silicon nitride ($SiN_x$) layer along with the blue-light transmission layer 320, the planarization layer 312, and the support layer 311 may be patterned to form a liquid crystal inlet 335 (referring to FIG. 15). The liquid crystal inlet 335 is not shown in FIG. 11 because the cross-sectional view of FIG. 11 is not positioned over the liquid crystal inlet 335.

Figure 12:
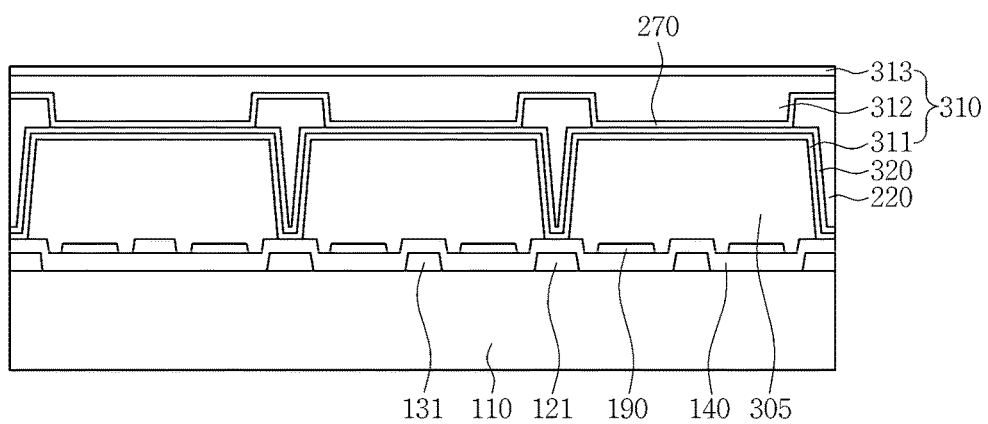

Subsequently, in reference to FIG. 12, an etchant is provided through the liquid crystal inlet 335 to remove the sacrificial layer 300 disposed within the support layer 311 and form a microcavity 305 (referring to FIG. 15) as being secured by the support layer 311. Such a process may be performed by a wet etching process in which the lower display panel 100 manufactured through processes illustrated in FIGS. 4-11 is immersed in an etchant such as a photoresist stripper (PR stripper) for a predetermined period.

Figure 13:
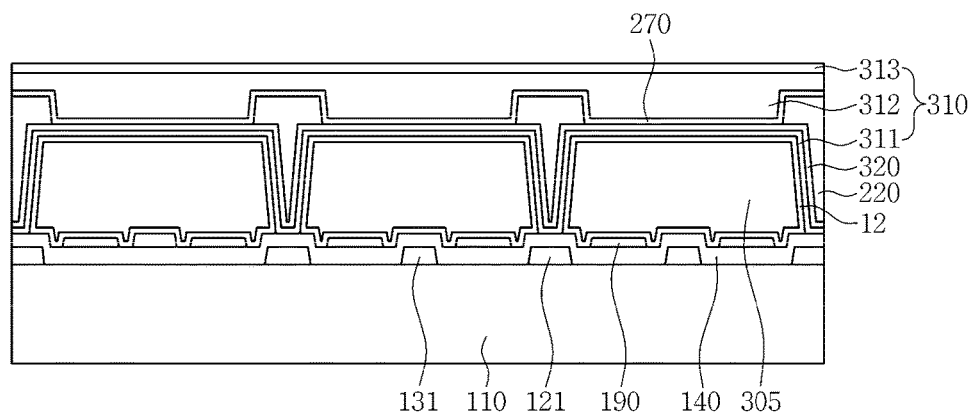

Subsequently, as illustrated in FIG. 13, an alignment layer 12 is formed within the microcavity 305. The alignment layer 12 within the microcavity 305 may be formed by fully filling, through the liquid crystal inlet 335, the microcavity 305 with an alignment solution in a liquid state by an inkjet process or a spin coating process, and curing at a temperature of about 210 degrees for about an hour. In this case, a solvent in the alignment solution may be evaporated, and polyimide (PI) may be cured inside the support layer 311 to form the alignment layer 12. The residual alignment solution may be discharged through the liquid crystal inlet 335 to be removed.

Figure 14:
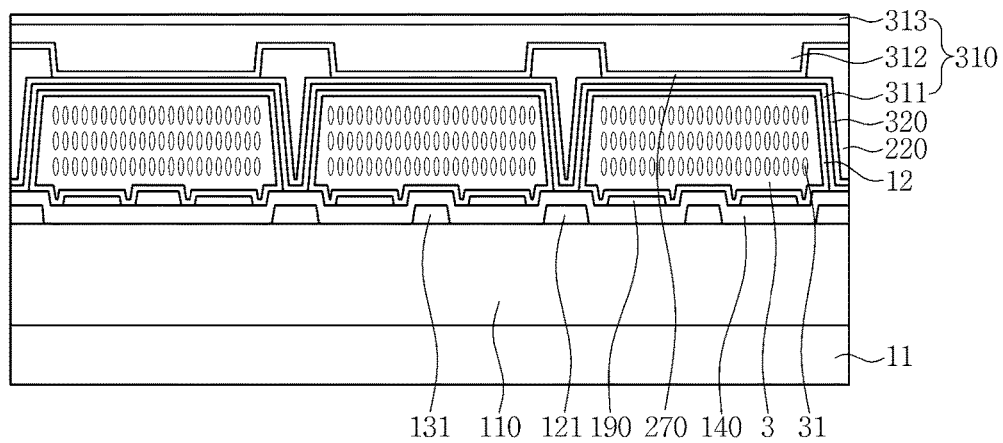

Subsequently, as illustrated in FIG. 14, a liquid crystal layer 3 is filled in the microcavity 305 and formed with the alignment layer 12. The microcavity 305 with the liquid crystal layer 3 may be filled by providing a liquid crystal material through an inkjet process or a spin coating process. In this case, the liquid crystal material may be injected into the microcavity 305 due to the interaction between a surface energy of the silicon nitride ($SiN_x$) forming the support layer 311 and the patterned insulating layer 313 and a capillary force generated in the liquid crystal inlet 335. The liquid crystal molecules 31 injected to the microcavity 305 may be aligned in a predetermined direction by the alignment layer 12. The liquid crystal layer 3 may have a thickness in a range of about 5 to 6 µm.

Figure 15:
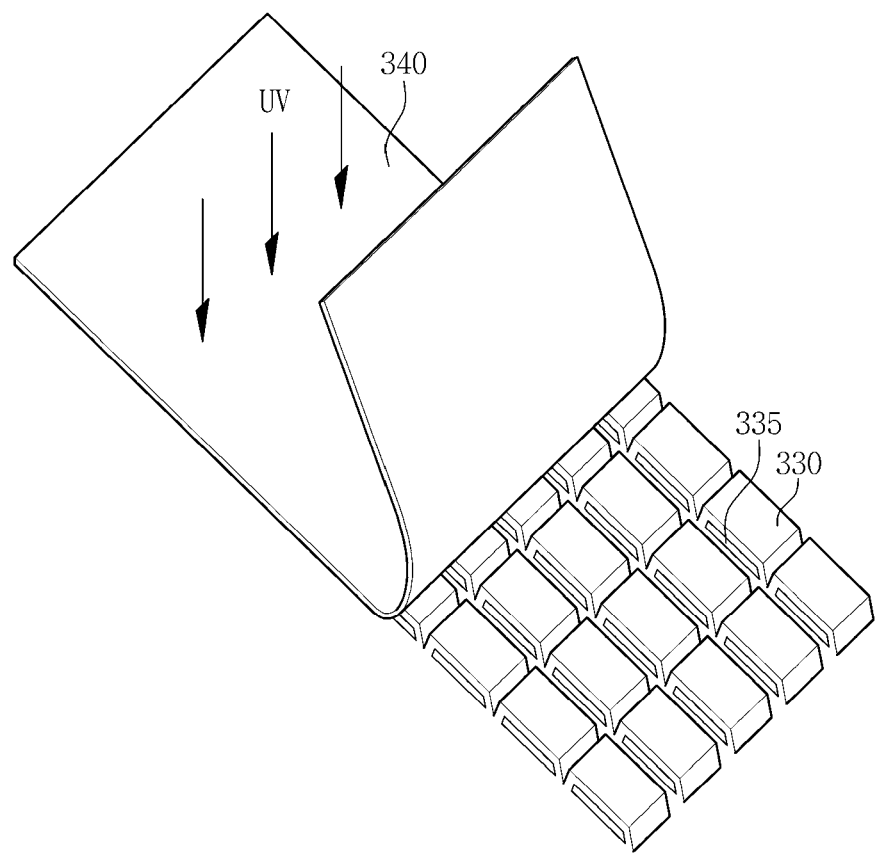

Subsequently, as illustrated in FIG. 15, a coating layer 340 is formed on the lower display panel 100 through an ultraviolet (UV) slit coating process and blocks the liquid crystal inlet 335 from external environment. The coating layer 340 may be formed by performing a slit coating process with a transparent organic material and irradiating UV light. The coating layer 340 illustrated in FIG. 15 is shown by way of example to block the liquid crystal inlet 335, and the coating layer may not necessarily be required. In a case where the liquid crystal inlet 335 may be blocked in a different scheme or have a structure not requiring blocking from external environment, a separate element for blocking the liquid crystal inlet 335 may not be provided. In some embodiments, the coating layer 340 may be omitted.

Subsequently, as illustrated in FIG. 3, a second polarizing plate 21 may be formed above the insulating layer 310. The second polarizing plate 21, in particular, may be formed to have a thickness, for example, in a range of about 100 to 200 µm. The second polarizing plate 21 may include a polarizing element that may generate a polarized light and a tri-acetyl-cellulose (TAC) layer that may secure device durability.

Further, as illustrated in FIG. 1, a first polarizing plate 11 may be attached onto a rear surface of the first substrate 110. The first polarizing plate 11 may include a polarizing element that may generate a polarized light and a tri-acetyl-cellulose (TAC) layer that may secure device durability.

The lower display panel 100 may be manufactured by the processes described above with references to FIGS. 4-15. The lower display panel 100 may include the liquid crystal layer 3, the common electrode 270, the alignment layer 12, the pixel electrode 190, the first polarizing plate 11, and the second polarizing plate 21. According to some embodiments, the lower display panel 100 may solely perform a basic operation of the LCD device. However, since being absent a color filter 230 which may represent color, the lower display panel 100 may not represent a color, and in this case, the lower display panel 100 may be referred to as a black LCD panel.

Figure 16:
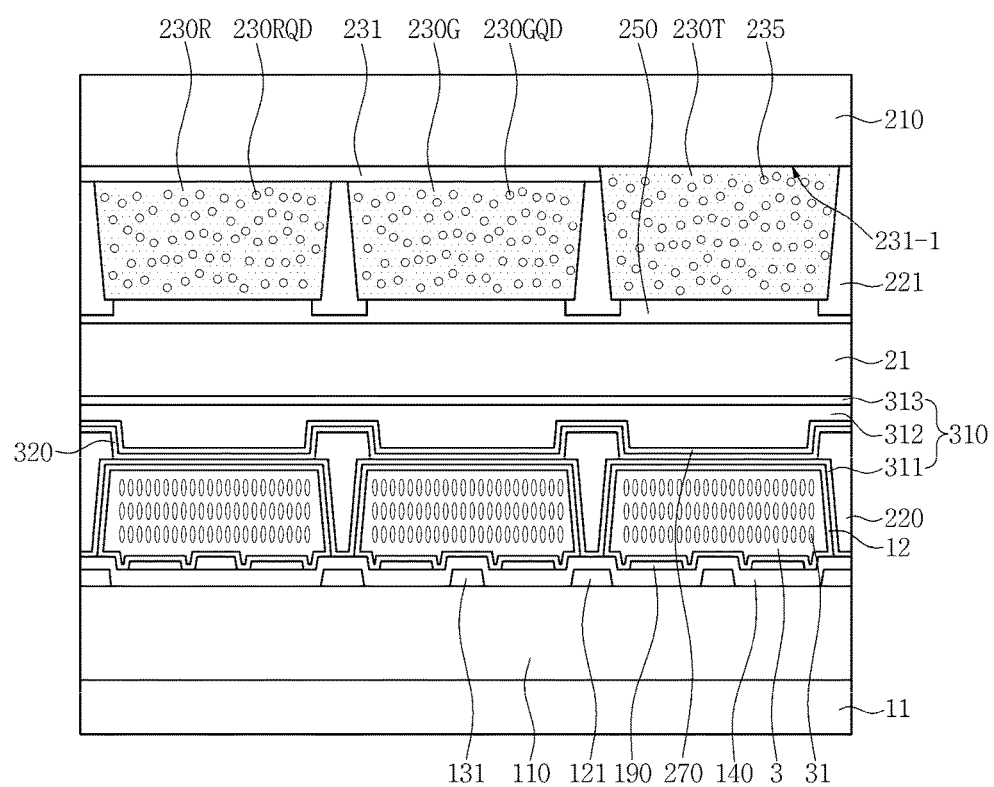
FIG. 16 is a cross-sectional view illustrating an LCD device, according to a second exemplary embodiment.
Figure 17:
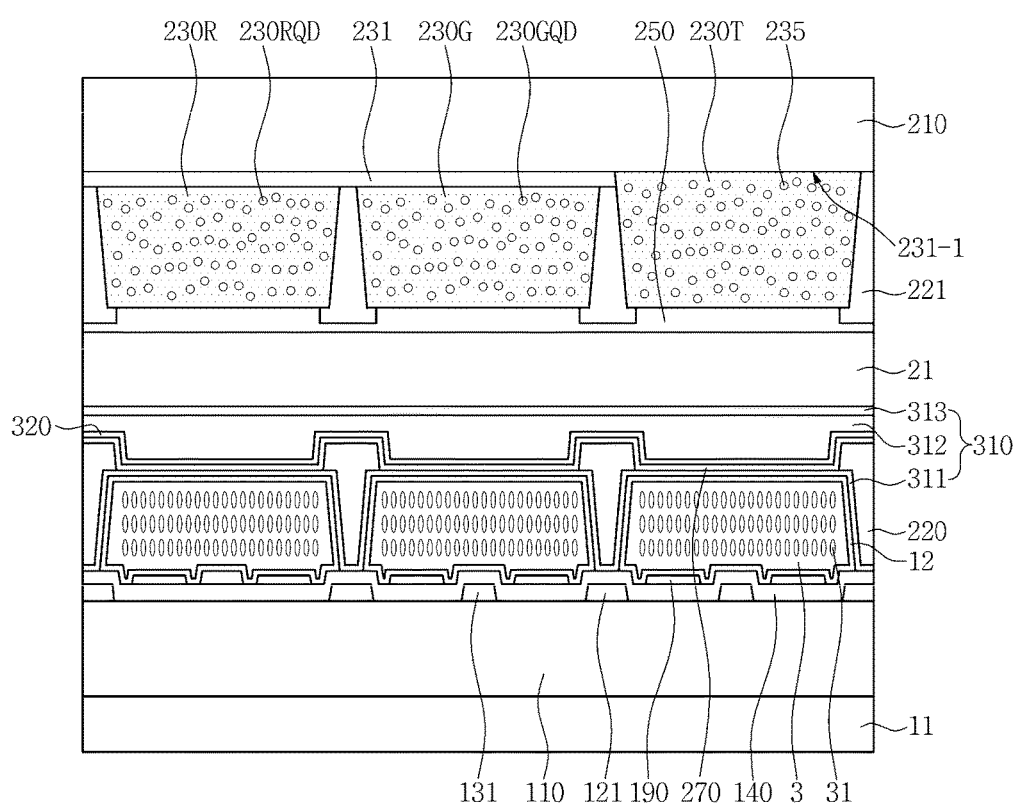
FIG. 17 is a cross-sectional view illustrating an LCD device, according to a third exemplary embodiment.
Figure 18:
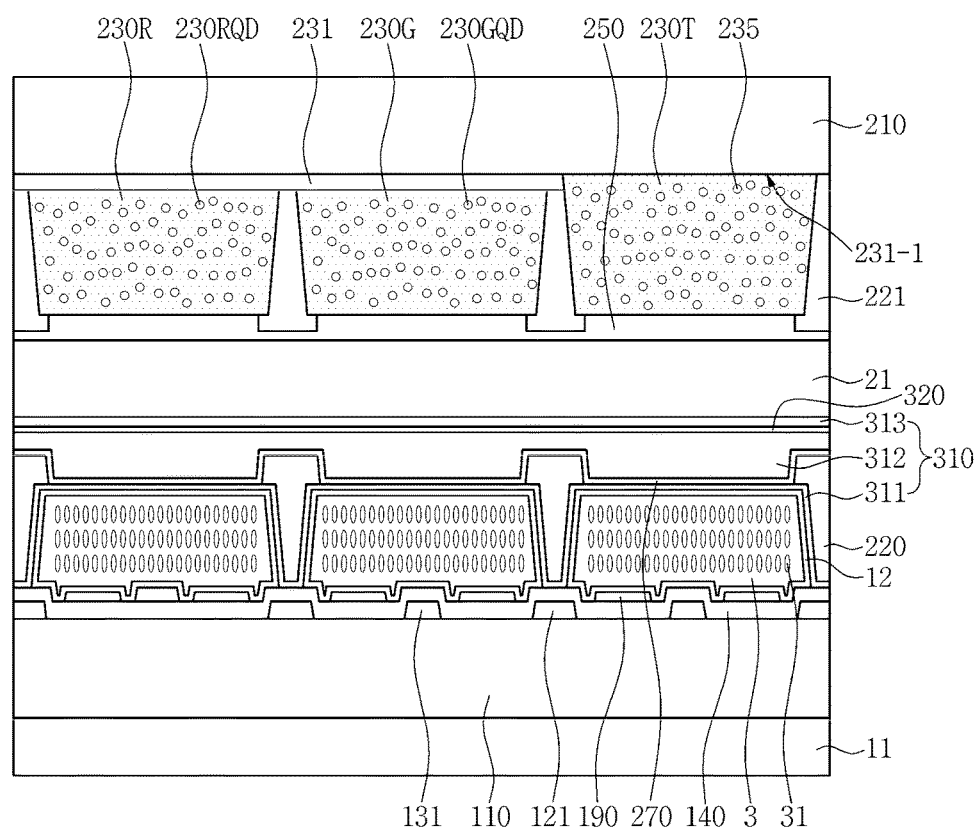
FIG. 18 is a cross-sectional view illustrating an LCD device, according to a fourth exemplary embodiment.
Figure 19:
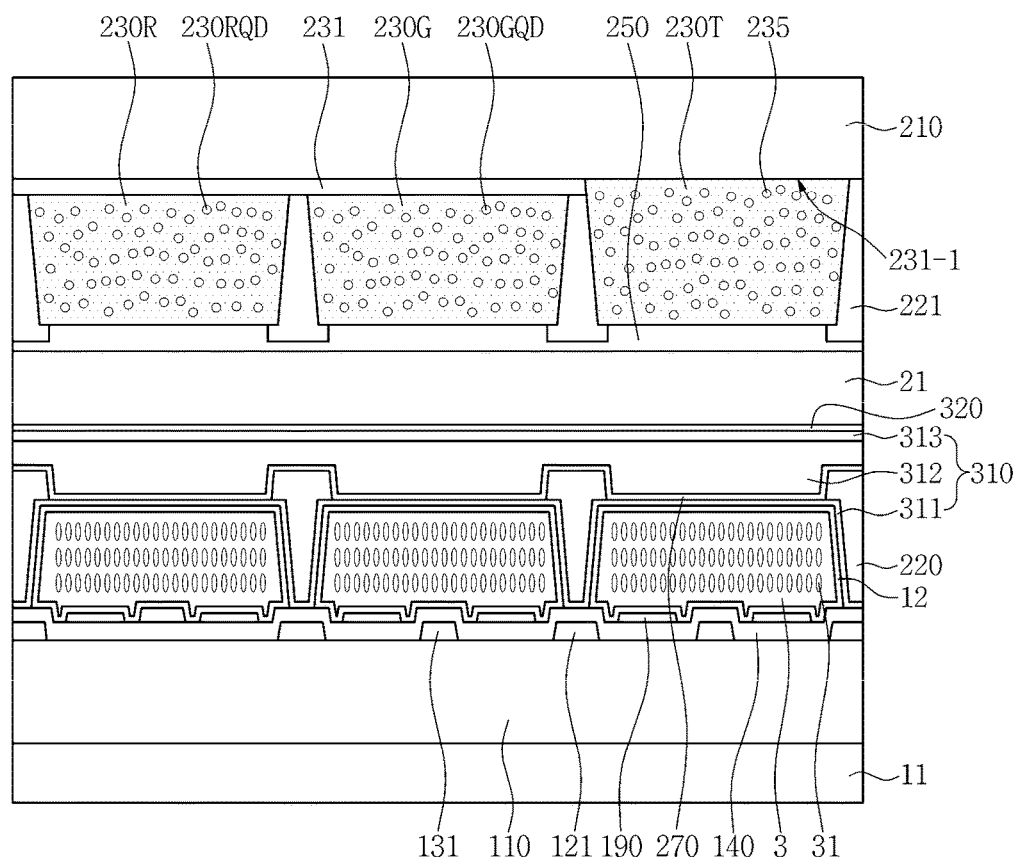
FIG. 19 is a cross-sectional view illustrating an LCD device, according to a fifth exemplary embodiment.

Hereinafter, display devices according to second through fifth exemplary embodiments will be described with reference to FIGS. 16 through 19. FIG. 16 is a cross-sectional view illustrating an LCD device, according to a second exemplary embodiment. FIG. 17 is a cross-sectional view illustrating an LCD device, according to a third exemplary embodiment. FIG. 18 is a cross-sectional view illustrating an LCD device, according to a fourth exemplary embodiment. FIG. 19 is a cross-sectional view illustrating an LCD device, according to a fifth exemplary embodiment.

In reference to FIG. 16, a blue-light transmission layer 320, according to the second exemplary embodiment, is formed above a first light blocking member 220 and a support layer 311. In this embodiment, the blue-light transmission layer 320 is formed between the first light blocking member 220 and the common electrode 270 and between the support layer 311 and the common electrode 270. In reference to FIG. 17, a blue-light transmission layer 320, according to the third exemplary embodiment, is formed between a common electrode 270 and a planarization layer 312. In reference to FIG. 18, a blue-light transmission layer 320, according to the fourth exemplary embodiment, is formed between the planarization layer 312 and the patterned insulating layer 313. In reference to FIG. 19, a blue-light transmission layer 320, according to the fifth exemplary embodiment, is formed between the patterned insulating layer 313 and the second polarizing plate 21.

From the foregoing, it will be appreciated that various embodiments in accordance with the present disclosure have been described herein for purposes of illustration, and that various modifications may be made without departing from the scope and spirit of the present disclosure. Accordingly, the various embodiments disclosed herein are not intended to be limiting of the scope and spirit of the present disclosure. Various features of the above described and other embodiments can be mixed and matched in any manner, to produce further embodiments consistent with the present disclosure.

What is claimed is:

1. A display device comprising:
   a first substrate;
   a support layer defining a microcavity above the first substrate;
   a liquid crystal layer formed in the microcavity;
   a planarization layer disposed on the support layer;
   a common electrode disposed between the support layer and the planarization layer; and
   a blue-light transmission layer disposed between the support layer and the common electrode.

2. The display device of claim 1, further comprising:
   a pixel electrode disposed below the support layer.

3. The display device of claim 1, wherein the blue-light transmission layer is disposed between the support layer and the planarization layer.

4. A display device comprising:
   a first substrate;
   a support layer defining a microcavity above the first substrate;
   a liquid crystal layer formed in the microcavity;
   a planarization layer disposed on the support layer;
   a second substrate disposed opposite to the first substrate;
   a color filter disposed on the second substrate;
   a first polarizing plate disposed below the liquid crystal layer;
   a second polarizing plate disposed between the liquid crystal layer and the color filter;
   a common electrode disposed between the support layer and the planarization layer; and;
   a blue-light transmission layer disposed between the common electrode and the planarization layer,
   wherein the planarization layer is disposed between the liquid crystal layer and the second polarizing plate.

5. The display device of claim 1, further comprising a light blocking member disposed between the support layer and an adjacent support layer.

6. The display device of claim 5, wherein the blue-light transmission layer is disposed between the support layer and the light blocking member.

7. The display device of claim 5, wherein the blue-light transmission layer is disposed between the light blocking member and the planarization layer.

8. The display device of claim 1, further comprising:
   a backlight unit disposed below the first substrate, the backlight unit comprising a light source;
   a second substrate disposed opposite to the first substrate;
   a color filter disposed on the second substrate;
   a first polarizing plate disposed below the liquid crystal layer; and
   a second polarizing plate disposed between the liquid crystal layer and the color filter.

9. The display device of claim 8, wherein the light source is a blue light source.

10. The display device of claim 9, wherein the color filter comprises a red color filter, a green color filter, and a transparent color filter, and the transparent color filter comprises light scattering particles.

11. The display device of claim 10, further comprising a blue-light blocking layer disposed on the red color filter and the green color filter.

12. The display device of claim 1, further comprising an alignment layer disposed on an inner surface of the support layer.

13. A display device comprising:
   a first substrate;
   a support layer defining a microcavity above the first substrate;
   a liquid crystal layer formed in the microcavity;
   a planarization layer disposed on the support layer;
   a second substrate disposed opposite to the first substrate;
   a color filter disposed on the second substrate;
   a first polarizing plate disposed below the liquid crystal layer;
   a second polarizing plate disposed between the liquid crystal layer and the color filter; and
   a blue-light transmission layer disposed between the planarization layer and the second polarizing plate,
   wherein the planarization layer is disposed between the liquid crystal layer and the second polarizing plate.

14. The display device of claim 13, further comprising a patterned insulating layer disposed between the planarization layer and the second polarizing plate.

15. The display device of claim 14, wherein the blue-light transmission layer is disposed between the planarization layer and the patterned insulating layer.

16. The display device of claim 14, wherein the blue-light transmission layer is disposed between the patterned insulating layer and the second polarizing plate.

17. The display device of claim 13, further comprising a backlight unit, the backlight unit being disposed below the first substrate and comprising a light source.

18. The display device of claim 17, wherein the light source is a blue light source.

19. The display device of claim 18, wherein the color filter comprises a red color filter, a green color filter, and a transparent color filter, and the transparent color filter comprises light scattering particles.

20. The display device of claim 19, further comprising a blue-light blocking layer disposed on the red color filter and the green color filter.

* * * * *